(12) United States Patent
Hauge (10) Patent No.: US 10,125,796 B2
(45) Date of Patent: Nov. 13, 2018

(54) ROTOR POSITIONING SYSTEM IN A PRESSURE EXCHANGE VESSEL

(71) Applicant: Leif J. Hauge, Virginia Beach, VA (US)

(72) Inventor: Leif J. Hauge, Virginia Beach, VA (US)

(*) Notice: Subject to any disclaimer, the term of this patent is extended or adjusted under 35 U.S.C. 154(b) by 80 days.

(21) Appl. No.: 14/784,803

(22) PCT Filed: Apr. 17, 2014

(86) PCT No.: PCT/US2014/034561
§ 371 (c)(1),
(2) Date: Oct. 15, 2015

(87) PCT Pub. No.: WO2014/172576
PCT Pub. Date: Oct. 23, 2014

(65) Prior Publication Data
US 2016/0084269 A1    Mar. 24, 2016

Related U.S. Application Data

(60) Provisional application No. 61/813,125, filed on Apr. 17, 2013.

(51) Int. Cl.
*F04F 13/00*    (2009.01)
*B01D 61/06*    (2006.01)

(52) U.S. Cl.
CPC .............. *F04F 13/00* (2013.01); *B01D 61/06* (2013.01)

(58) Field of Classification Search
CPC ................................ F04F 13/00; B01D 61/06
USPC ........................................................ 417/64
See application file for complete search history.

(56) References Cited

U.S. PATENT DOCUMENTS

| 4,274,811 | A  | * | 6/1981  | Rao ........................ | F04F 13/00 |
|           |    |   |         |                              | 415/217.1  |
| 5,988,993 | A  |   | 11/1999 | Hauge                        |            |
| 6,540,487 | B2 |   | 4/2003  | Polizos et al.               |            |
| 7,201,557 | B2 | * | 4/2007  | Stover ..................... | F04F 13/00 |
|           |    |   |         |                              | 415/104    |
| 7,306,437 | B2 | * | 12/2007 | Hauge ..................... | F04F 13/00 |
|           |    |   |         |                              | 210/652    |
| 7,997,853 | B2 | * | 8/2011  | Pique ..................... | B01D 61/06 |
|           |    |   |         |                              | 415/116    |
| 8,075,281 | B2 | * | 12/2011 | Martin .................... | F04F 13/00 |
|           |    |   |         |                              | 417/64     |
| 2006/0245909 | A1 | | 11/2006 | Stover                       |            |
| 2009/0180903 | A1 | | 7/2009  | Martin et al.                |            |

OTHER PUBLICATIONS

International Search Report from International Patent Application No. PCT/US2014/034561, dated Aug. 28, 2014.
Written Opinion from International Patent Application No. PCT/US2014/034561, dated Aug. 28, 2014.
International Preliminary Report on Patentability from International Patent Application No. PCT/US2014/034561, dated Oct. 29, 2015.

* cited by examiner

*Primary Examiner* — Peter J Bertheaud
(74) *Attorney, Agent, or Firm* — Hunton Andrews Kurth LLP (57) ABSTRACT

A rotor positioning system for rotary pressure exchangers with a rotor with a central bore accommodating an axle affixed to end covers in each end having at least one pair of high and low pressure ports in communication with opposing end cover ports through coaxial rotor ducts.

8 Claims, 8 Drawing Sheets

ROTOR POSITIONING SYSTEM IN A PRESSURE EXCHANGE VESSEL

CROSS-REFERENCE TO RELATED APPLICATIONS

This patent application is a national stage application of International Patent Application No. PCT/US2014/034561, filed Apr. 17, 2014, which claims priority to U.S. Provisional Patent Application No. 61/813,125, filed Apr. 17, 2013, and U.S. Provisional Patent Application No. 61/847,829, filed Jul. 18, 2013, the disclosures of each of which are herein incorporated by reference.

BACKGROUND INFORMATION

The invention relates to a rotary pressure exchanger for transfer of pressure energy from one fluid to another by direct contact positive displacement. Such pressure exchangers are designed with a rotor being rotated by the fluid streams or by an external motor. The flow driven designs use either a sleeve or a central axle for positioning of the rotor between two pairs of end covers. The axle based pressure exchanger has the distinct advantage of being a very compact design as the rotor can be much larger within same size housing and accommodate up to twice the flow. Rotary pressure exchangers have become a leading energy recovery device for Sea Water Reverse Osmosis (SWRO) due to exceptional high efficiency and small footprint. Seawater is very corrosive with low viscosity leading to many challenges that demands the ultimate performance of materials, design and manufacturing.

U.S. Pat. No. 7,306,437 discloses a pressure exchanger of having a flow driven rotor positioned on an axle. In order to prevent axial lock-up were the rotor is forced into mechanical contact in the peripheral areas, the end covers have a central step where the end clearance with the rotor is reduced. This feature is difficult to manufacture as it prevents flatness to be addressed by precision lapping and also lacks any true axial bearing stiffness as it relies only on a weak hydrodynamic effect.

U.S. Pat. No. 5,988,993 discloses a rotor positioning system for a sleeve based rotary pressure exchanger using a known element of a step bearing on the rotor surface. A single central manifold receives high pressure fluid that drains over the step bearings to each end of the rotor and into a collector manifold located in the end covers, from where fluid flows into the low pressure stream. This arrangement provides basically only hydrostatic radial bearing stiffness as only the limited and narrow small clearance area at the end of each step bearing is subject to hydrodynamic action.

Thus, there is a need for a rotor positioning system for rotary pressure exchangers that does not have the above noted disadvantages of existing flow driven devices.

SUMMARY OF THE INVENTION

The present invention provides a rotor positioning system for rotary pressure exchangers, comprising: a rotor with a central bore accommodating an axle affixed to end covers in each end having at least one pair of high and low pressure ports in communication with opposing end cover ports through coaxial rotor ducts and with sealing areas between high and low pressure ports, wherein the axle or rotor bore has hydrostatic bearing features on each end with individual high pressure fluid supply manifolds on the axle connecting to the high pressure port of each end cover and separated by a hydrodynamic bearing surface.

In another embodiment, the high pressure bearing flow preferably drains into collecting manifolds recessed in each end of the central rotor bore.

In another embodiment, the high pressure fluid supply manifolds preferably are located at a distance from the axle end giving similar flow resistance as in a drainage gap between the rotor and the end covers.

In another embodiment, the bearing surface on each axle end or in each bore end has a radial hydrostatic feature in the form of a step bearing.

In another embodiment, the bearing surface between the high pressure fluid supply manifolds and collecting manifolds is of same diameter as the hydrodynamic bearing surface.

In another embodiment, the rotor positioning system for rotary pressure exchangers provides a system comprising: a rotor with a central bore accommodating an axle affixed to end covers in each end having at least one pair of high and low pressure ports in communication with opposing end cover ports through coaxial rotor ducts and with sealing areas between high and low pressure ports, wherein the axle or rotor bore has hydrostatic bearing features on each end with individual high pressure fluid supply manifolds on the axle connecting to the high pressure port of each end cover and separated by a hydrodynamic bearing surface, wherein the high pressure bearing flow preferably drains into collecting manifolds recessed in each end of the central rotor bore.

In another embodiment, the rotor positioning system for rotary pressure exchangers provides a system comprising: a rotor with a central bore accommodating an axle affixed to end covers in each end having at least one pair of high and low pressure ports in communication with opposing end cover ports through coaxial rotor ducts and with sealing areas between high and low pressure ports, wherein the axle or rotor bore has hydrostatic bearing features on each end with individual high pressure fluid supply manifolds on the axle connecting to the high pressure port of each end cover and separated by a hydrodynamic bearing surface, wherein the high pressure fluid supply manifolds preferably are located at a distance from the axle end giving similar flow resistance as in a drainage gap between the rotor and the end covers.

In another embodiment, the rotor positioning system for rotary pressure exchangers provides a system comprising: a rotor with a central bore accommodating an axle affixed to end covers in each end having at least one pair of high and low pressure ports in communication with opposing end cover ports through coaxial rotor ducts and with sealing areas between high and low pressure ports, wherein the axle or rotor bore has hydrostatic bearing features on each end with individual high pressure fluid supply manifolds on the axle connecting to the high pressure port of each end cover and separated by a hydrodynamic bearing surface, wherein the bearing surface on each axle end or in each bore end has a radial hydrostatic feature in the form of a step bearing.

In another embodiment, the rotor positioning system for rotary pressure exchangers provides a system comprising: a rotor with a central bore accommodating an axle affixed to end covers in each end having at least one pair of high and low pressure ports in communication with opposing end cover ports through coaxial rotor ducts and with sealing areas between high and low pressure ports, wherein the axle or rotor bore has hydrostatic bearing features on each end with individual high pressure fluid supply manifolds on the axle connecting to the high pressure port of each end cover and separated by a hydrodynamic bearing surface, wherein the bearing surface between the high pressure fluid supply manifolds and collecting manifolds is of same diameter as the hydrodynamic bearing surface.

In another embodiment, the rotor positioning system for rotary pressure exchangers provides a system comprising: a rotor with a central bore accommodating an axle affixed to end covers in each end having at least one pair of high and low pressure ports in communication with opposing end cover ports through coaxial rotor ducts and with sealing areas between high and low pressure ports, wherein the axle or rotor bore has hydrostatic bearing features on each end with individual high pressure fluid supply manifolds on the axle connecting to the high pressure port of each end cover and separated by a hydrodynamic bearing surface, wherein the high pressure bearing flow preferably drains into collecting manifolds recessed in each end of the central rotor bore, wherein the high pressure fluid supply manifolds preferably are located at a distance from the axle end giving similar flow resistance as in a drainage gap between the rotor and the end covers, wherein the bearing surface on each axle end or in each bore end has a radial hydrostatic feature in the form of a step bearing, wherein the bearing surface between the high pressure fluid supply manifolds and collecting manifolds is of same diameter as the hydrodynamic bearing surface.

In accordance with at least one embodiment of this invention, an axle based rotor positioning system that has both strong hydrostatic and hydrodynamic action yielding unsurpassed axial and radial bearing stiffness is provided. By having separate supply manifolds to each bearing, a large central area is available on the axle for hydrodynamic bearing function. These and other embodiments and advantages of the present invention, which may be employed individually or in selective combination, will become apparent from the following detailed description, taken in conjunction with the accompanying drawings, illustrating by way of example the principles of the invention.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF PREFERRED EMBODIMENTS

The following description is intended to convey a thorough understanding of the embodiments described by providing a number of specific embodiments and details involving rotor positioning system in a pressure exchange vessel. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

The present invention provides for a rotor positioning system for pressure exchangers using a central stationary axle. Hydrostatic bearing features on each end are separated by a hydrodynamic bearing surface. Each end of the axle contain a radial manifold directly connected to each high pressure fluid stream from where the fluid flows through the annular clearance space between the axle and the rotor bore towards a circumferential groove at each bore end. This groove drains through the end clearance between rotor and each end cover into the low pressure stream. Any rotor movement away from a central axial position builds up unequal pressure in each groove and seeks to correct such movement. Excessive radial movement of the rotor is resisted by the hydrodynamic action and in particular during start-up and low RPM by the hydrostatic bearing features.

The axial positioning feature described in U.S. Pat. No. 7,306,437 using an elevated surface on the end face of the rotor, complicating manufacturing procedures to achieve parallel end surfaces by lapping and is also subject to rapid wear as the hydrodynamic forces are weak. The present embodiments introduce a stiffer positioning system that is independent of hydrodynamic action and without conflicting manufacturing procedures. The present embodiments also retain the radial hydrodynamic positioning of the rotor by using a hydrostatic principle in each end of the rotor (by having individual and separate flow supply to each end of the rotor) while maintaining a large central surface on the axle and rotor bore for the hydrodynamic bearing.

It is further possible to increase the radial stiffness by incorporating a step bearing feature in the clearance between the supply manifold in each end of the axle and the collection groove in each end of the rotor bore.

A pressure exchanger described herein may utilize direct contact positive displacement in a SWRO desalinatin plant. The axle positioned rotor principle allows for large flow as rotor diameter is not limited by an outer sleeve.

In addition, the present invention provides advantages over prior energy recovery devices. For example, the devices described herein allow for a large single duct row rotor capable of double flow with hydraulic losses and mixing reduced to half compared to a sleeve based unit. Also, the high pressure ports of each end cover may have no ramps and do not impart rotational momentum regardless of flow or direction which minimizes or eliminates accidental over rotation with damaging caviation. A large low pressure balance pocket may minimize or eliminate elastic deformations due to asymmetric high pressure load, allowing half the internal leakage compared to a sleeve based unit. The internal ceramic component assembly is enclosed with a split pressure vessel may be made of a durable metal, such as Titanium G2 which has superior corrosion resistance. Also, the split pressure vessel comprising the rotor assembly may have only one external seal that may greatly reduce the potential for any leaks. In the present invention, the rotor may revolve around a stationary axle affixed to the end covers having hydrostatic axial and hydrodynamic radial positioning. The volumetric mixing in the units described herein may be 1-3%, or 1%, 2%, or 3%.

Figure 1:
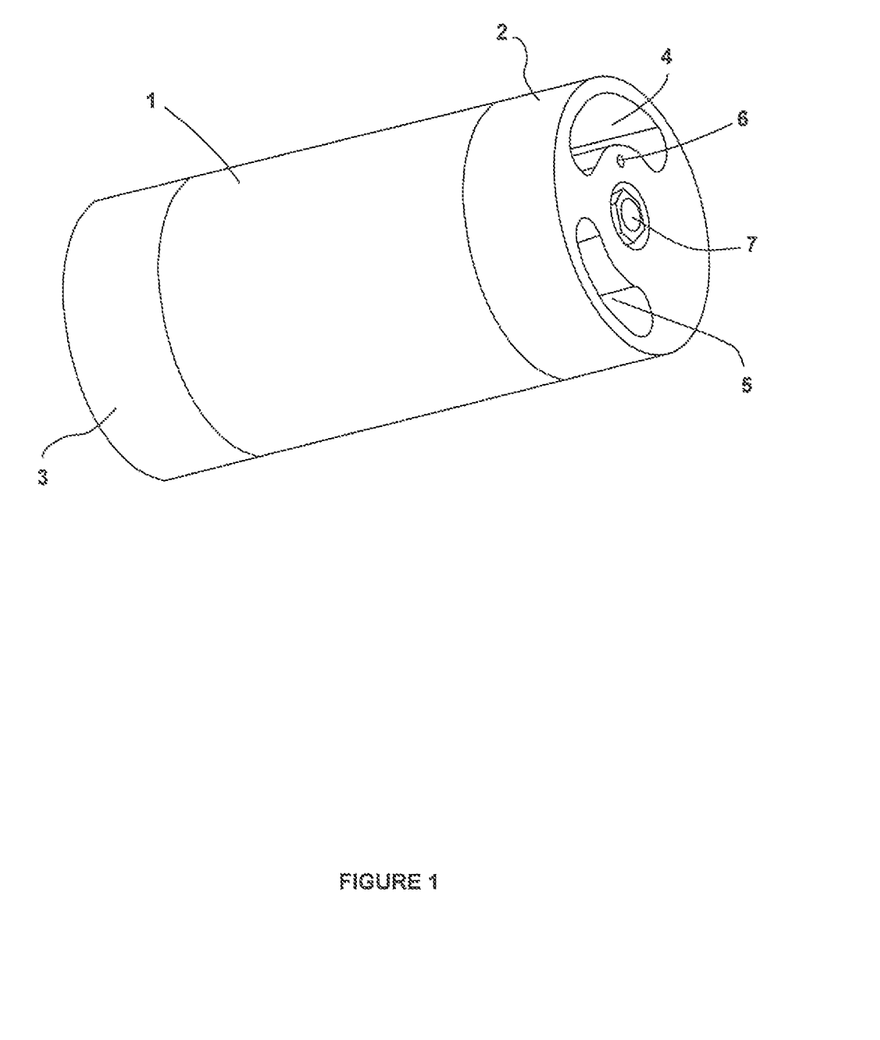
FIG. 1 is an external perspective view of an internal pressure exchanger assembly having an axle based rotor positioning system according to a particular embodiment.

FIG. 1 shows an external view of the internal assembly of a pressure exchanger according to a particular embodiment. The pressure exchanger includes a rotor 1, a first end cover 2, and a second end cover 3. The first end cover 2 comprises at least one high pressure inlet 4 for receiving a first stream of high pressure liquid. The first stream may be a concentrate. The first end cover 2 further comprises at least one low pressure outlet 5 through which the first stream eventually flows out of the pressure exchanger. The end covers each have at least one bearing flow passage (such as bearing flow passage 6 in first end cover 2) supplying high pressure fluid to each of the bearing features, as will be shown in reference to FIGS. 2-7. The pressure exchanger includes a tension rod 7 that holds the rotor/end cover assembly together. The end covers, rotor, and axle may be made of a corrosion resistant material, such as ceramic. For example, the end covers, rotor, and/or axle may be made of Alumina® ceramic (aluminum oxide ceramic), optionally 92% to 99.8% aluminum oxide ceramic. The end covers, rotor, and/or axle may be made of Alumina® ceramic (99.8% aluminum oxide ceramic).

Figure 2:
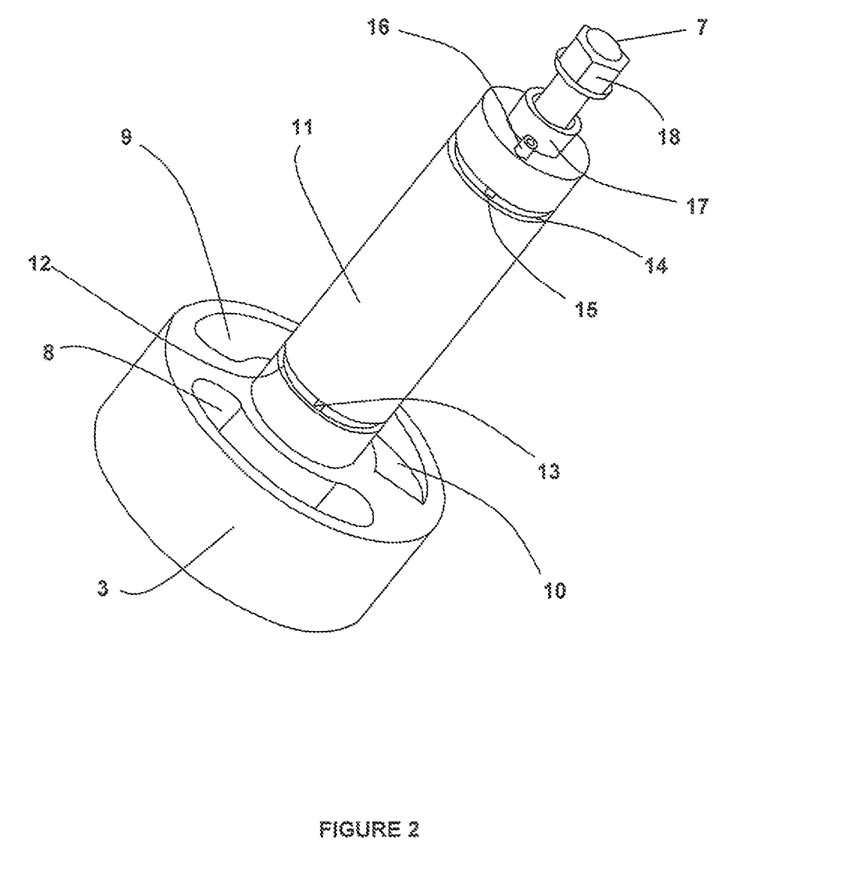
FIG. 2 is a perspective view of the axle attached to one end cover according to a particular embodiment.

FIG. 2 shows a perspective view of an axle 11 attached to the second end cover 3. As shown in FIG. 2, the second end cover 3 includes at least one high pressure port 8 and at least one low pressure port 9 with a ramp 10 for inducing flow driven rotation of the rotor 1. Low pressure port 5 may include a similar ramp for inducing flow driven rotation of the rotor 1. High pressure ports 4 and 8 may not impart any rotational momentum on the rotor, regardless of the flow direction. A second stream may enter the low pressure port 9 and eventually exit the high pressure port 8. The second stream may be seawater in a SWRO desalination plant where pressure would be transferred from the first stream to the second stream.

As shown in FIG. 2, the axle 11 includes two separate hydrostatic bearing manifolds 12 and 14 in each end. Bearing manifolds 12 and 14 may each comprise a circumferential groove in the outer surface of axle 11. In this embodiment, manifolds 12 and 14 have rectangular cross-sections. In other embodiments, either of bearing manifolds 12 and 14 may have circular cross-sections. As shown in FIG. 2, bearing manifold 14 may be located proximate to the location of first end cover 2 when first end cover 2 is attached to axle 7 (not shown in FIG. 2). Similarly, bearing manifold 12 may be located proximate to the location of second end cover 3. In this embodiment, bearing manifolds 12 and 14 are equidistant from the respective ends of axle 11. The outer surface of axle 11 between manifolds 12 and 14 may serve as a large hydrodynamic bearing surface when the pressure exchanger is in operation.

Bearing manifold 14 may include at least one inlet opening 15 that connects bearing manifold 14 to high pressure fluid through an internal passage connected to the high pressure port 4 of the first end cover 2. Specifically, inlet opening 15 connects to the high pressure port 4 via internal passage 29, locator bushing 16, and internal passage 36 (shown in more detail in FIGS. 5 and 6). The area outside of the end cover 2 connects directly to high pressure port 4 and opening 6 communicates with that area. In some embodiments, a slanted hole is drilled from internal passage 36 to intersect directly with high pressure port 4. The locator bushing 16 secures angular alignment between the end covers 2 and 3 for flow through. Similarly, bearing manifold 12 includes at least one inlet opening 13 that connects bearing manifold 12 to high pressure fluid through an internal passage connected to the high pressure port 8 of the second end cover 3. An axle bushing 17 aligns the axle 11 at the center of each end cover. The axle and the end covers are secured together via tension rod 7 with a nut 18.

Figure 3:
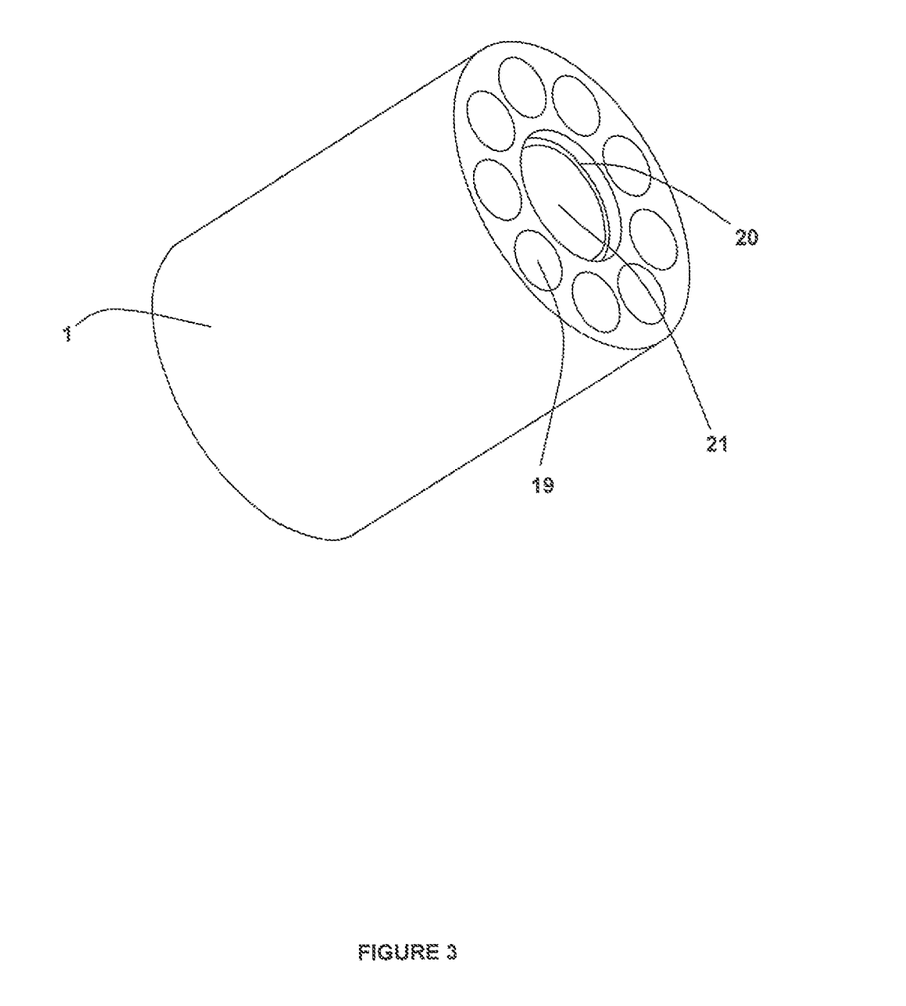
FIG. 3 is a is a perspective view of the rotor according to a particular embodiment.

FIG. 3 shows the rotor 1 having a central bore 21. The rotor 1 has one or more through going ducts 19. The longitudinal axis of each through-going duct 19 is parallel to the longitudinal axis of rotor 1. When a through-going duct 19 is aligned with the end cover ports, the fluid through one end cover port may displace the fluid in the through-going duct 19 through the opposite end cover port. In operation, central bore 21 may enclose axle 11. The pressure exchange between the first stream and the second stream occurs within the through-going ducts 21 of the rotor 1. This process is described in detail in U.S. Pat. No. 7,306,437, the disclosure of which is incorporated by reference herein in its entirety.

As shown in FIG. 3, the surface of central bore 21 includes at least two manifold circumferential grooves 20, located proximate to each end of the rotor 1. The grooves 20 and bearing manifolds 12 and 14 may together act as the hydrostatic bearing components of the pressure exchanger. The grooves 20 may have similar cross-sections to the manifolds 12 and/or 14. The grooves 20 may be spaced equidistant from the respective ends of the rotor 1. When the pressure exchanger is operating, axle 11 is placed in rotor bore 21, the manifold grooves 20 are located closer to the respective ends of the rotor than the corresponding bearing manifolds 12 and 14. This is shown in more detail in FIGS. 6 and 7. In this configuration, when the pressure exchanger is in operation, the area between the outer surface of axle 11 and the inner surface of central bore 21—the rotor bore clearance—includes both hydrodynamic and hydrostatic bearing surfaces, as will be explained in greater detail with respect to FIGS. 5-7.

Figure 4:
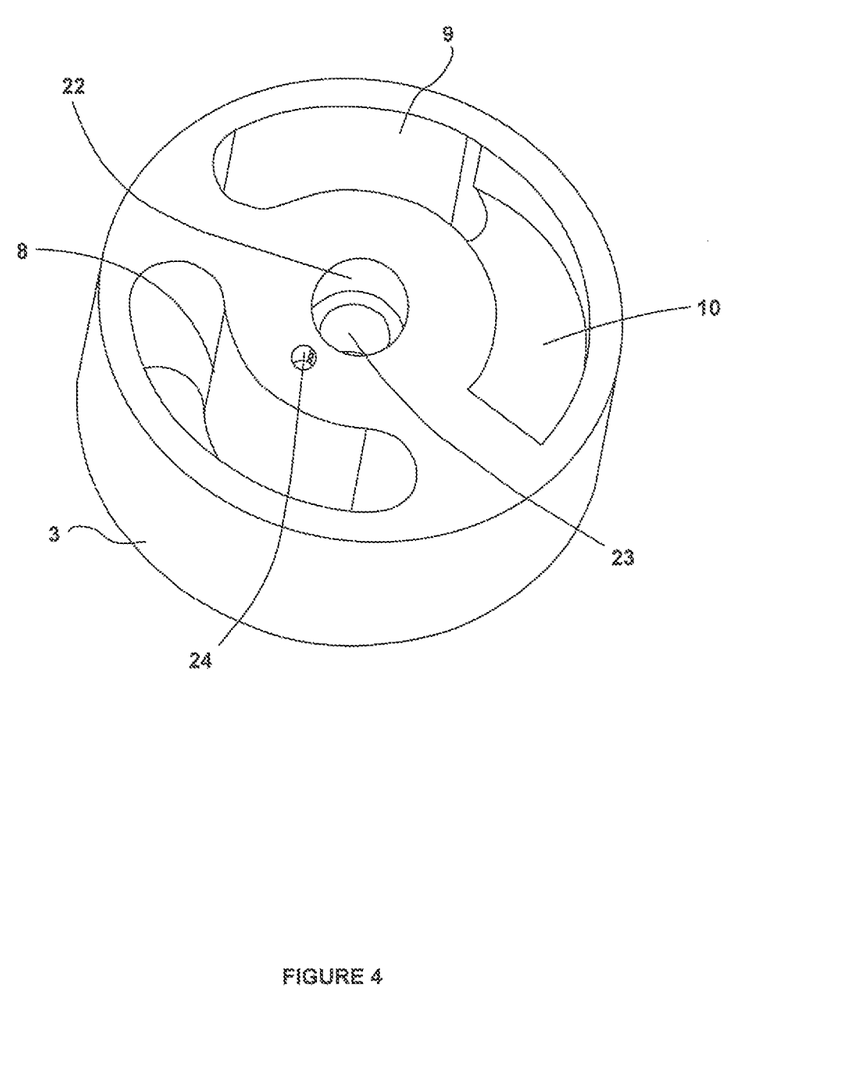
FIG. 4 is a perspective view of an end cover according to a particular embodiment.

FIG. 4 shows additional details of the end covers as illustrated by the second end cover 3 having a locator recess 24 for the second locator bushing 16 (not shown in FIG. 4) securing angular alignment with the axle 11. This locator recess 24 that leads to an internal passage 37 (shown in FIG. 6) in the end cover connecting to high pressure fluid. A center recess 22 affixes the axle 11 at the center of the end cover 3 and the end cover bore 23 accommodates tension rod 7 (as shown in FIG. 6).

Figure 5:
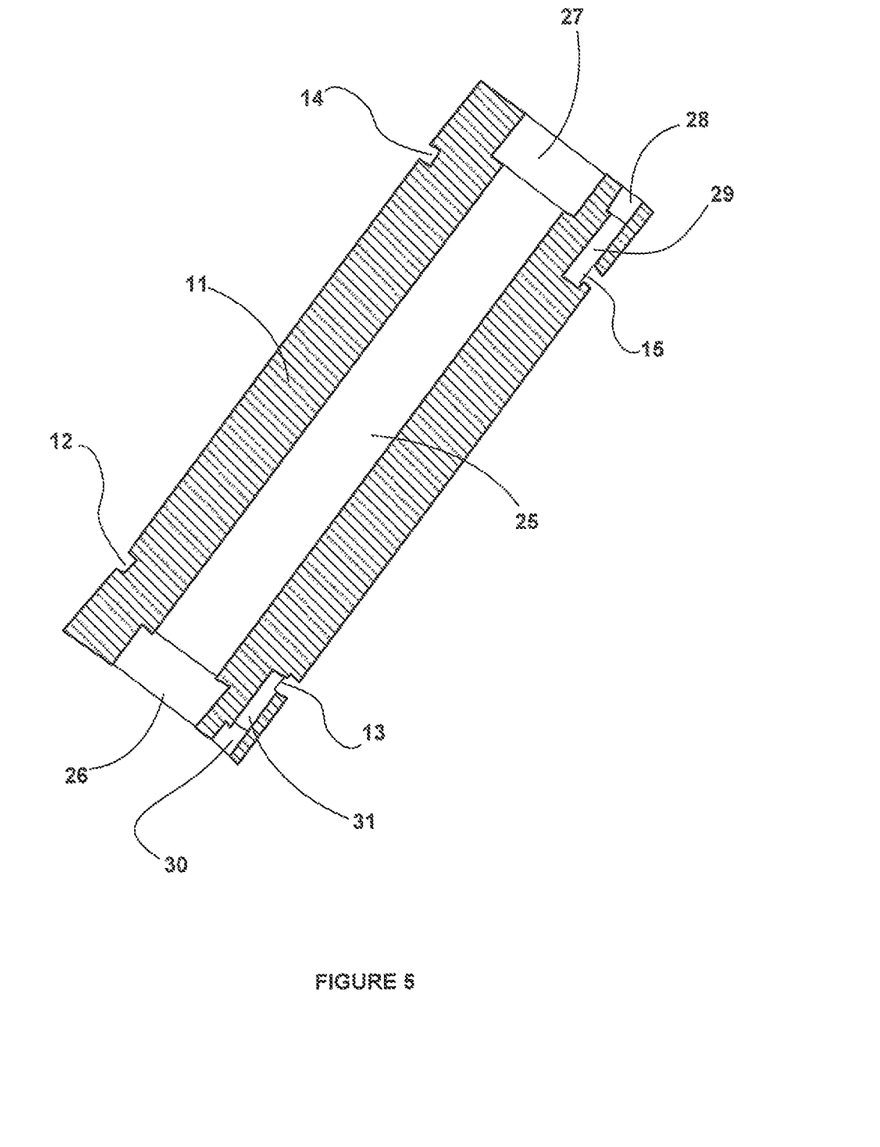
FIG. 5 is a cross section of an axle according to a particular embodiment.

FIG. 5 shows a cross section of the axle 11. In operation, high pressure fluids from each stream are delivered to bearing manifolds 12 and 14 via openings 13 and 15. These openings 13 and 15 are in turn connected to internal passages 31 and 29, respectively. The internal passages 31 and 29 are connected to internal passages 37 and 36, respectively (shown in FIG. 6), in the end covers via locator bushings (such as locator pin 16 shown in FIG. 6) seated in the recesses 30 and 28. Center recess 26 and 27 in each end of the axle 11 seats a center bushing 17 for alignment of the end covers. A through going center bore 25 accommodates the tension rod 7. As high pressure fluid flows out of the openings 13 and 15 and into bearing manifolds 12 and 14, it drains towards the grooves 20 (shown in FIGS. 6 and 7). The outer surface of rotor 11 between hydrostatic manifolds 14 and 12 acts as a hydrodynamic bearing surface as the rotor 1 rotates about the axle.

Figure 6:
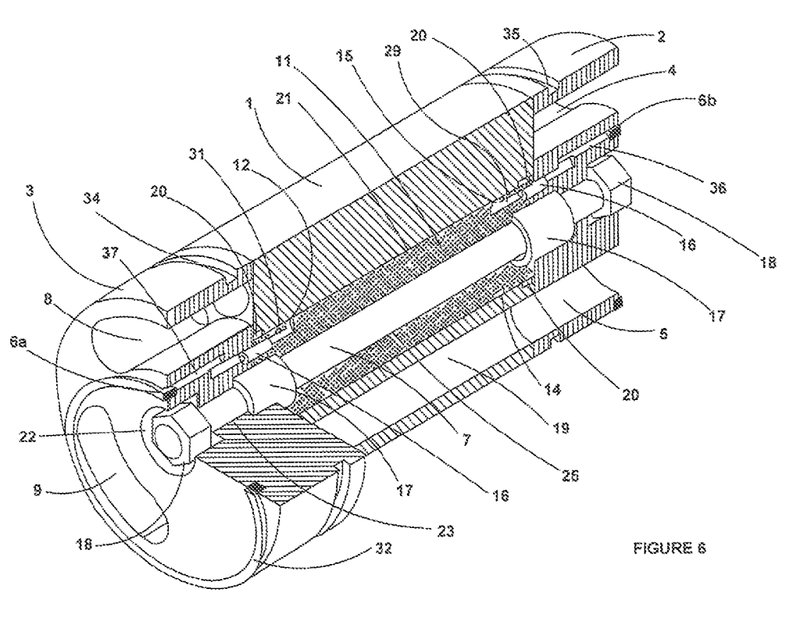
FIG. 6 is a sectional view of a pressure exchanger according to a particular embodiment.

FIG. 6 shows a cross section of the components of the pressure exchanger in FIG. 1. The pressure exchanger may be enclosed in a titanium pressure vessel (not shown). As shown in FIG. 6, end covers 2 and 3 are held against each end of the stationary axle 11, which has a bore 25 for the tension rod 7. As shown in the embodiment in FIG. 6, each end of tension rod 7 may be secured to the end covers 2 and 3 using one or more nuts 18, which may be centered on the axle 11 via two center bushings 17. At each end, locator pin 16 connects internal passages 37 and 31 (for the end of rotor 1 adjacent to end cover 3), and passages 36 and 29 (for the end of rotor 1 adjacent to end cover 2). The locator pins 16 also affixes the positions of the end covers. In operation, the end covers 2 and 3, tension rod 7, and axle 11 remain stationary, while the rotor 1 rotates about the axle 11.

When the pressure exchanger is in operation, the hydrostatic axial bearing components (12, 14, and 20) receive flow from the high pressure port (8 and 4, respectively) into the annulus openings (6a and 6b, respectively), through internal passages (37 and 36, respectively), through the hollow locator pins 16, and the internal passages (31 and 29, respectively) whereof the high pressure fluid is distributed in the radial manifolds (12 and 14, respectively). From there, the high pressure fluid flows through the rotor bore clearance between the outer surface of axle 11 and the inner surface of rotor bore 21 into the collector grooves 20 located at each end of the rotor bore 21. When the fluid reaches the grooves 20, it will have reached some intermediate pressure. The intermediate pressure will depend on the rotor position between the end covers.

While FIG. 6 does not depict the clearances, in operation, there will be a rotor bore clearance between the outer surface of the axle 11 and the inner surface of the rotor bore 21 of rotor 1. In some embodiments the rotor bore clearance may range from 10-20 microns. The rotor bore clearance may range from about 1, 2, 3, 4, 5, 6, 7, 8, 9, 10, 11, 12, 13, 14, 15, 16, 17, 18, 19, 20, 21, 22, 23, 24, or 25 microns. The rotor bore clearance may be about 1-10 microns, 5-15 microns, 10-20 microns, 15-25 microns, or 10-15 microns.

Additionally, in operation, there is an end clearance between each end of rotor 1 and the adjacent surface of the end covers. In some embodiments the end clearance may range from 10-20 microns. The end clearance may range from about 1, 2, 3, 4, 5, 6, 7, 8, 9, 10, 11, 12, 13, 14, 15, 16, 17, 18, 19, 20, 21, 22, 23, 24, or 25 microns. The end clearance may range from about 1-10 microns, 5-15 microns, 10-20 microns, 15-25 microns, or 10-15 microns. When the pressure exchanger is in operation, as the rotor 1 rotates around the axle 11, the grooves 20 may also receive fluid flow from the high pressure ports (8 and 4) via this end clearance between the rotor and end covers, as well as from the bearing manifolds 12 and 15. Furthermore, this flow will then drain from groove 20 through the end clearance to the low pressure ports 9 and 5. The pressure in the collector grooves 20 will increase if the end clearance decreases as a result of the rotor moving closer to one end cover and the resistance to out flow increases, which produces an axial force on the rotor end that acts to return the rotor to a center position between the two end covers.

In operation, the hydrodynamic bearing surface of rotor 1 and central bore 21 (e.g., the area of rotor 1 between hydrostatic bearing manifolds 12 and 14) may provide radial positioning stiffness. As the rotor 1 rotates about the axle, the rotational axis of the rotor may tend to move away from a coaxial position with the axle. If this occurs, certain areas of the rotor bore clearance may shrink, and the large hydrodynamic bearing surface may cause radial forces in these areas to counteract the movement of the rotor 1 and act to return the rotor to a coaxial position with the axle 11. The hydrostatic bearing components may also accomplish this using one or more step bearings, as will be illustrated in connection with FIG. 7.

Figure 7:
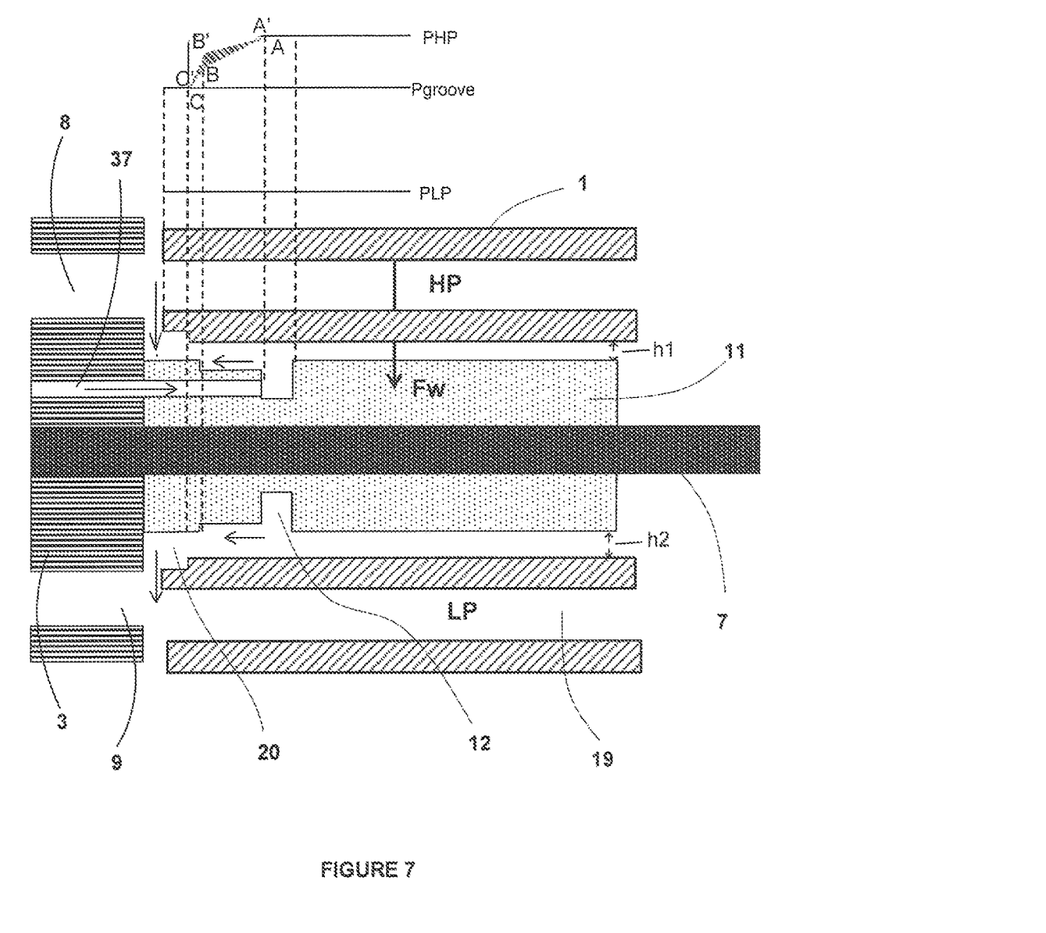
FIG. 7 depicts a cross section of a pressure exchanger having a step bearing according to a particular embodiment.

FIG. 7 shows the operation of a step bearing located in each end of the rotor/axle combination that allows for hydrostatic radial positioning of the rotor 1, according to an embodiment. In this example, the pressure exchanger's axis of rotation (around tension rod 7) is oriented horizontally. The topside of the rotor is the portion above the axle 11, and includes a through-going duct 19 that passes high pressure fluid (HP) during the part of its rotation when it aligns with the ports 4 and 8 in the end covers. The underside of the rotor is the portion below the axle 11, and includes a through-going duct 19 that passes low pressure fluid (LP) during the part of its rotation when it aligns with the ports 5 and 9 in the end covers. In this configuration, the weight of the rotor 1 produces a downward force Fw, causing the topside of the rotor bore clearance to reduce to h1 (where the rotor bore clearance is measured as the distance between the inner surface of the rotor 1 and the outer surface of the axle 11), while the underside rotor bore clearance is increased to h2. This position produces an equal counteracting upward hydrostatic force due to the different pressure gradients developing in the step bearing geometry.

The embodiment in FIG. 7 only depicts the half of the rotor and axle adjacent to the second end cover 3. In this embodiment, the step bearing receives high pressure flow from the high pressure port area 8 through an internal channel 37 in end cover 3. The high pressure is distributed evenly around the manifold bearing 12 and the flow path on the topside is A', B' and C', while the underside flow path is A, B and C. It follows that pressure at A'=A as this is the uniform axle manifold 12 pressure and equals the high pressure PHP. It also follows that pressure at C'=C as this is the rotor groove 20 pressure Pgroove distributed uniformly around the axle.

The flow path from the axle manifold 12 to the rotor groove 20 must pass through a clearance with a step of uniform height around the axle 11. However, when the rotor is displaced and not concentric with the axle, the relative resistance changes and the average pressure will not be the same.

As shown in the Pressure Diagram in FIG. 7, the intermediate pressure B' on the top side is greater than the intermediate pressure B on the underside of the axle, which creates an opposing force seeking to counter the weight of the rotor. The pressure gradient A-B-C in the underside with the larger clearance is approaching a straight line the larger the clearance becomes as the flow path becomes more uniform. The opposite takes place on the topside where the step clearance gets narrower and the pressure gradient A'-B'-C' has higher average pressure due to the relative higher step flow resistance. The step bearing does as is shown in FIG. 7 where the weight displaces the rotor downward, that yields a radial force as the radial pressure gradient becomes unequal.

Figure 8:
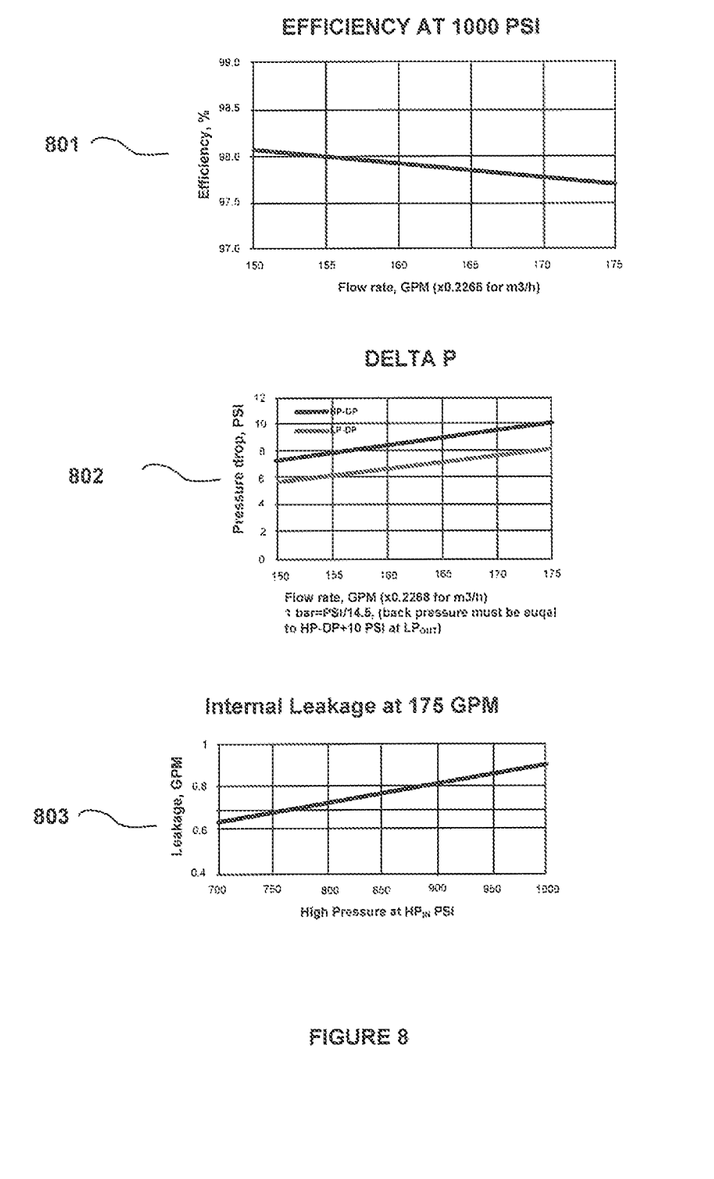
FIG. 8 depicts several graphs showing the efficiency as a function of flow rate, pressure drops as a function of flow rate, and leakage as a function of high pressure, according to a particular embodiment.

FIG. 8 depicts a series of charts 801, 802, and 803. Each chart depicts operational characteristics of a pressure exchanger according to an particular embodiment. The pressure exchanger may be similar to the pressure exchangers depicted in any of FIGS. 1-7. In these charts, the concentrate enters a first port (such as high pressure inlet 4) at a pressure HPin and and displaces seawater at a HP-DP lower pressure via a through-going duct 19 and out the opposite duct 8. The pressure of the exiting seawater may be HPout. Seawater enters the port 9 at a pressure LPin and displaces concentrate at a LP-DP lower pressure through the port 5 at a pressure LPout. A back pressure equal to HP-DP+10 psi must be applied on the concentrate discharge in order to suppress cavitation. Within the limits indicated, the maximum flow rate is a function of efficiency and energy cost, meaning higher flows at lower efficiency could yield faster payback than using a higher cost model with higher efficiency. Chart 801 shows the relationship between efficiency and flow rate at 1000 psi. Chart 802 shows the pressure drop as a function of flow rate for both HP-DP and LP-DP. Chart 803 shows the internal leakage as a function of HPin for a flow rate of 175 GPM.

The following Table 1 shows operational characteristics of a pressure exchanger having different rotor sizes.

TABLE 1

| Example Device | A | B | C | D | E | F | G | H | I | J | K | L | M | N | O |
|---|---|---|---|---|---|---|---|---|---|---|---|---|---|---|---|
| MAX FLOW, gpm | 30 | 38 | 45 | 65 | 80 | 95 | 120 | 150 | 175 | 190 | 240 | 280 | 400 | 500 | 600 |
| m3/h | 7 | 9 | 10 | 15 | 18 | 22 | 27 | 34 | 40 | 43 | 55 | 64 | 91 | 125 | 137 |
| ROTOR SIZE | | | 3" | | | | 4" | | | 5" | | | 6" | | 8" |
| OPERATIONAL | | | | | | | | | | | | | | | |
| Max brine inlet pressure | 1000 PSI | | | 1000 PSI | | | 1000 PSI | | | 1000 PSI | | | 1000 PSI | | |
| Min LP discharge pressure | 8 PSI | | | 8 PSI | | | 8 PSI | | | 8 PSI | | | 8 PSI | | |
| Peak efficiency @1000 PSI | 97% | | | 97.50% | | | 98% | | | 98.50% | | | 99% | | |
| Volumetric mixing | 3% | | | 3% | | | 3% | | | 3% | | | 2% | | |
| MATERIALS | | | | | | | | | | | | | | | |
| Pressure vessel | TITANIUM G2 | | | TITANIUM G2 | | | TITANIUM G2 | | | TITANIUM G2 | | | TITANIUM G2 | | |
| Rotor, axle and end covers | ALUMINA 99.8% | | | ALUMINA 99.8% | | | ALUMINA 99.8% | | | ALUMINA 99.8% | | | ALUMINA 99.8% | | |
| CONNECTIONS | | | | | | | | | | | | | | | |
| Grooved Victaulic type | 1¼" | | | 1½" | | | 2" | | | 3" | | | 4" | | |
| DIMENSIONS | 10" × 5" × 5" | | | 12" × 6" × 6" | | | 17" × 7" × 7" | | | 23" × 10" × 10" | | | 30" × 12" 12" | | |
| DRY WEIGHT | 8 lbs. | | | 15 lbs. | | | 30 lbs. | | | 55 lbs. | | | 160 lbs. | | |

The examples contained herein are offered by way of illustration and not by any way of limitation. Although the invention has been described in some detail by way of illustration and example for purposes of clarity of understanding, it should be understood that certain changes and modifications may be practiced within the scope of the appended claims. Modifications of the above-described modes for carrying out the invention that would be understood in view of the foregoing disclosure or made apparent with routine practice or implementation of the invention to persons of skill in fluid mechanics, fluid dynamics, mechanical engineering, and/or related fields are intended to be within the scope of the following claims.

All publications (e.g., Non-Patent Literature), patents, patent application publications, and patent applications mentioned in this specification are indicative of the level of skill of those skilled in the art to which this invention pertains. All such publications (e.g., Non-Patent Literature), patents, patent application publications, and patent applications are herein incorporated by reference to the same extent as if each individual publication, patent, patent application publication, or patent application was specifically and individually indicated to be incorporated by reference.

While the foregoing invention has been described in connection with this preferred embodiment, it is not to be limited thereby but is to be limited solely by the scope of the claims which follow.

The invention claimed is:

1. A rotor positioning system for rotary pressure exchangers comprising:
a rotor with a central bore accommodating an axle affixed to end covers in each end having at least one pair of high and low pressure ports in communication with opposing high and low pressure end cover ports through coaxial rotor ducts and with sealing areas between high and low pressure ports,
wherein the axle or central rotor bore has hydrostatic bearing features on each end thereof with individual high pressure fluid supply manifolds on the axle connecting to the high pressure port of each end cover and separated by a hydrodynamic bearing surface, the hydrostatic bearing features comprising individual and separate flow supply to each end of the rotor.

2. The rotor positioning system of claim 1, wherein a high pressure fluid flow preferably drains into collecting manifolds recessed in each end of the central rotor bore.

3. The rotor positioning system of claim 1, wherein the high pressure fluid supply manifolds preferably are located at a distance from respective ends of the axle giving similar flow resistance as in a drainage gap between the rotor and the end covers.

4. The rotor positioning system of claim 1, wherein the hydrostatic bearing feature on each axle end or in each central rotor bore end has a radial hydrostatic feature in the form of a step bearing.

5. The rotor positioning system of claim 1, wherein the end covers, rotor, and/or axle are made of an aluminum oxide ceramic.

6. The rotor positioning system of claim 5, wherein the end covers, rotor, and/or axle are made of an 92% to 99.8% aluminum oxide ceramic.

7. A rotor positioning system for rotary pressure exchangers, comprising:
a rotor with a central bore accommodating an axle affixed to end covers in each end having at least one pair of high and low pressure ports in communication with opposing high and low pressure end cover ports through coaxial rotor ducts and with sealing areas between high and low pressure ports,
wherein the axle or central rotor bore has hydrostatic bearing features on each end with individual high pressure fluid supply manifolds on the axle connecting to the high pressure port of each end cover and separated by a hydrodynamic bearing surface, wherein a high pressure fluid flow drains into collecting manifolds recessed in each end of the central rotor bore, and
wherein the end covers, rotor, and/or axle are made of an aluminum oxide ceramic.

8. A rotor positioning system for rotary pressure exchangers comprising:
a rotor with a central bore accommodating an axle affixed to end covers in each end having at least one pair of high and low pressure ports in communication with opposing high and low pressure end cover ports through coaxial rotor ducts and with sealing areas between high and low pressure ports, wherein the axle or central rotor bore has hydrostatic bearing features on each end thereof with individual high pressure fluid supply manifolds on the axle connecting to the high pressure port of each end cover and separated by a hydrodynamic bearing surface, wherein the high pressure fluid supply manifolds are located at a distance from the respective axle ends giving similar flow resistance as in a drainage gap between the rotor and the end covers, and wherein the end covers, rotor, and/or axle are made of an aluminum oxide ceramic.

* * * * *